US011996614B2

(12) United States Patent
Coles et al.

(10) Patent No.: US 11,996,614 B2
(45) Date of Patent: May 28, 2024

(54) APPARATUS AND METHOD FOR IMPROVING SPECIFIC ABSORPTION RATE (SAR) USING METALLIC SHEETS AS REFLECTORS

(71) Applicant: Meta Platforms Technologies, LLC, Menlo Park, CA (US)

(72) Inventors: Katherine Coles, San Jose, CA (US); Umar Azad, Santa Clara, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/404,032

(22) Filed: Aug. 17, 2021

(65) Prior Publication Data

US 2023/0063870 A1 Mar. 2, 2023

(51) Int. Cl.
*H01Q 1/24* (2006.01)
*H01Q 1/52* (2006.01)
*H01Q 15/14* (2006.01)

(52) U.S. Cl.
CPC .................................. *H01Q 15/14* (2013.01)

(58) Field of Classification Search
CPC .. H01Q 1/24; H01Q 1/22; H01Q 1/38; H01Q 1/48; H01Q 1/52; H01Q 1/526; H01Q 15/14
See application file for complete search history.

(56) References Cited

U.S. PATENT DOCUMENTS 6,369,765 B1 * 4/2002 Davis .................... H01Q 1/242 343/702
6,380,900 B1 * 4/2002 Kanayama ............. H01Q 1/245 343/702
7,539,510 B2 * 5/2009 Toyoda .................... H01Q 1/52 343/702
8,208,980 B2 * 6/2012 Wong ..................... H01Q 5/371 343/702
9,935,378 B2 * 4/2018 Camacho ............... H01Q 5/371
2004/0046701 A1 * 3/2004 Huber ...................... H01Q 1/48 343/702
2005/0024275 A1 * 2/2005 Jo .......................... H01Q 19/28 343/702
2012/0044115 A1 * 2/2012 McCaughey .......... H01Q 1/245 343/702
2014/0266945 A1 9/2014 Dou

OTHER PUBLICATIONS

International Search report and Written Opinion for International Application No. PCT/US2022/040493, dated Nov. 22, 2022, 9 pages.

* cited by examiner

*Primary Examiner* — Tho G Phan
(74) *Attorney, Agent, or Firm* — Foley & Lardner LLP

(57) ABSTRACT

Disclosed herein includes a wireless electronic device, including an outer casing, an antenna, and a metallic sheet. The outer casing may be electrically non-conductive. The antenna may be disposed within the outer casing and configured to perform wireless communication of signals at an operating wavelength of λ unit length. The metallic sheet may be disposed on a portion of the outer casing and placed at a distance of at least λ/25 unit length apart from the antenna. The metallic sheet may be configured to shield a subject exposed to energy radiated by the antenna to limit the specific absorption rate (SAR) of the subject to less than 1.6 W/kg.

19 Claims, 6 Drawing Sheets

APPARATUS AND METHOD FOR IMPROVING SPECIFIC ABSORPTION RATE (SAR) USING METALLIC SHEETS AS REFLECTORS

FIELD OF DISCLOSURE

The present disclosure is generally related to an apparatus and method for reducing specific absorption rate (SAR) arising from a wireless electronic device, including but not limited to, an apparatus and method for reducing SAR using a reflector in a wireless electronic device.

BACKGROUND

SAR is a measure of radio frequency (RF) energy absorption by a body from a source being tested (for example, a cellular phone, a tablet computer etc.). SAR is a measure of RF exposure from a portable wireless device including one or more batteries therein, to ensure that the device is within the safety guidelines provided by compliance authorities e.g., FCC (Federal Communications Commissions in USA). For example, FCC requires portable wireless devices to not exceed the FCC's maximum permissible exposure levels, e.g., 1.6 Watts/kg averaged over 1 gram average. SAR can be tested on Dosimetric Assessment System (Dasy) systems for compliance and certification of wireless device using standardized models of the human head and body to simulate RF absorption characteristics of different human tissues. It is possible to meet SAR requirements by transmitting lower power in a portable wireless device. However, this can significantly reduce the data rate and the operational range of the device, thereby degrading the performance of the device. Therefore, it would be beneficial to manage SAR from portable wireless devices without degrading the performance of the devices.

SUMMARY

Various embodiments disclosed herein are related to an apparatus and method for improving the SAR using a metallic sheet as a reflector and/or shield in a wireless electronic device. In some embodiments, the wireless electronic device may include an outer casing, an antenna, and a metallic sheet. The outer casing may be electrically non-conductive. The antenna may be disposed within the outer casing and configured to perform wireless communication of signals at an operating wavelength of λ unit length. The metallic sheet may be disposed on a portion of the outer casing and placed at a distance of at least λ/25 unit length apart from the antenna. The metallic sheet may be configured to shield a subject exposed to energy radiated by the antenna to limit the SAR of the subject to less than 1.6 W/kg.

In some embodiments, the metallic sheet may be disposed on an inner surface of the outer casing. In some embodiments, the metallic sheet may include at least one of copper, aluminum, nickel, or platinum, silver, or gold. In some embodiments, the metallic sheet may be a metallic tape attached to the outer casing. In some embodiments, the antenna may be placed at a range of 3-7 millimeter (mm) apart from the outer casing.

In some embodiments, the metallic sheet may at least partially overlap a radiation pattern of the antenna. The metallic sheet may have substantially a same shape as a shape of the antenna. The metallic sheet may have an area greater than or equal to an area of the antenna.

In some embodiments, the metallic sheet may have a thickness greater than or equal to a skin depth of a material of the metallic sheet. In some embodiments, the metallic sheet is configured to limit the SAR of the subject to less than 1.2 W/kg.

In some embodiments, an air gap is present between the antenna and the metallic sheet. In some embodiments, an air gap is present between the antenna and the outer casing. The antenna may be printed on a surface of an audio box.

Various embodiments disclosed herein are related to a method for implementing a wireless electronic device to improve the SAR using a metallic sheet as a reflector. In some embodiments, the method may include providing an outer casing that is electrically non-conductive. The method may include disposing an antenna within the outer casing, the antenna to perform wireless communication of signals at an operating wavelength of λ unit length. The method may include disposing a metallic sheet on a portion of the outer casing, at a distance of at least λ/25 unit length apart from the antenna, to shield a subject exposed to energy radiated by the antenna to limit the SAR of the subject to less than 1.6 W/kg.

In some embodiments, in disposing the metallic sheet, the metallic sheet may be disposed on an inner surface of the outer casing. In some embodiments, the metallic sheet may be a metallic tape, and in disposing the metallic sheet, the metallic tape may be attached to the outer casing. In some embodiments, in disposing the antenna, the antenna may be placed at a range of 3-7 mm apart from the outer casing.

In some embodiments, the method may include forming an air gap between the antenna and the metallic sheet. In some embodiments, the method may include forming an air gap between the antenna and the outer casing. In disposing the antenna, the antenna may be printed on a surface of an audio box.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
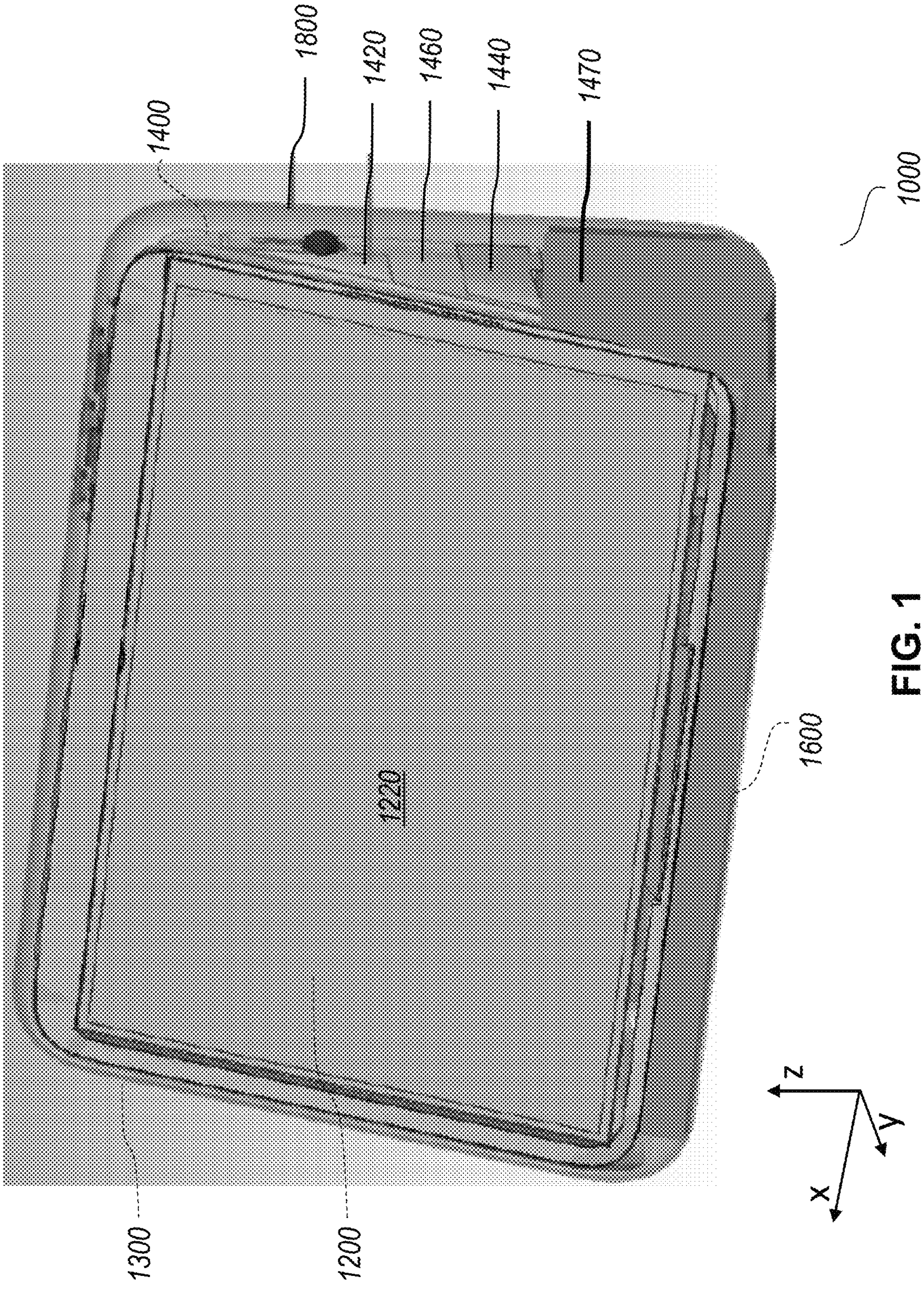
FIG. 1 is a diagram of an example of a wireless electronic device, according to an example implementation of the present disclosure.

Embodiments disclosed herein describe a wireless electronic device and a method for implementing the wireless electronic device, to improve (e.g., reduce or limit) SAR using a metallic sheet as a reflector and/or shield. The wireless electronic device may include an outer casing, an antenna, and a metallic sheet. The outer casing may be electrically non-conductive. The antenna may be disposed within the outer casing and configured to perform wireless communication of signals at an operating wavelength of λ unit length. The metallic sheet may be disposed on a portion of the outer casing and placed at a distance of at least λ/25 unit length apart from the antenna. The metallic sheet may be configured to shield a subject exposed to energy radiated by the antenna to limit the SAR of the subject to less than 1.6 W/kg. Embodiments disclosed herein include apparatuses and methods for (1) placing an antenna in a device to be away from a body part of a subject or a user, and (2) using a metallic reflector or shield to reflect and/or shield a radio frequency (RF) electromagnetic field from (e.g., generated by) the antenna, to limit absorption by the body part. Using the apparatuses and methods described herein, the device can meet the SAR requirements set by Federal Communications Commission (FCC) without significantly reducing the transmission efficiency (e.g., amount or portion of transmission successful emitted/output from the device), data rate and/or the operational range of the device.

One problem relates to improving SAR for a wireless device to meet FCC SAR requirements limiting the exposure to human body. For example, portable wireless devices, which are equipped with one or more batteries and can be held by users, may be subject to FCC SAR requirements.

One approach to meet FCC SAR requirements is to use capacitive proximity sensors in a portable device to detect the presence of a human body, and to back-off the transmit power when the human body in proximity to the device is detected. However, capacitive proximity sensors can be triggered by not only a human body but also a case or a surface of the device or nearby objects such as granite, wood, marble, metal, etc., and thereby power back-off may be triggered (as false-positives) most of the times. This approach also requires integrating the capacitive sensors into the device and routing the signals to a printed circuit board (PCB), thereby adding cost and complexity. Moreover, this approach may require the device to support two power tables, one for free space and one for a body, adding further complexity (e.g., adding complexity to the firmware).

Another approach to meet FCC SAR requirements is to reduce transmit power from a portable device such that the device meets the FCC SAR requirements. However, if the device transmits lower power, it can significantly reduce the data rate and the operational range of the device, hence degrading the user experience.

To solve these problems, according to certain aspects, embodiments in the present disclosure relate to techniques for a wireless electronic device to meet FCC SAR requirements using one or more reflectors or shields to deliver improved user wireless experience without (or while minimizing) degrading the performance of the device (e.g., antenna performance). In some embodiments, reflectors or shields may be metal sheets (e.g., copper tape/layer/plate).

According to certain aspects, embodiments in the present disclosure relate to techniques for placing an antenna in a wireless device to be away from a surface of the device, hence (e.g., when a human body is in contact with, or in proximity of, the device) increasing the distance from the antenna to the body and reducing the RF exposure on the body. In some embodiments, the antenna may be placed in the device at a distance (e.g., less than or equal to 7 mm) from an edge or an outer surface of the device, instead of placing the antenna directly on the outer surface, so as to increase the spacing between the antenna and the body, and minimize the RF absorption by the body.

In some embodiments, a distance between the antenna (internal to the device) and an edge or an outer surface of the device may be determined by determining an expected location of a human body relative to the device (e.g., location of a SAR hotspot) and moving the antenna away from the expected location of the human body to a distance such that the SAR value measured at a distance can meet FCC SAR requirements. Here, "SAR hotspot" refers to an area or volume of a body where the maximum energy (or at least a predefined level/portion of radiated energy) is absorbed. For example, if the SAR hotspot of a body is located on or in proximity of a right edge of a portable wireless device, the location of the antenna can be determined to be away from the right edge by a distance such that the SAR value measured with the antenna placed at the distance meets the FCC SAR requirements, e.g., being less than 1.6 W/kg. In other words, the antenna may be placed away from a surface of the device thereby increasing the distance from the antenna to the SAR hotspot of the body. In some embodiments, the antenna may be placed 3-7 mm away from an outer casing (e.g., an exterior/interior surface of the casing) or a side edge (e.g., extremity or surface) of the device.

In some embodiments, the antenna may be placed in or on a side of an audio box (e.g., speaker box, speaker enclosure, acoustic enclosure, audio output box) of the device such that a distance from the antenna to a surface of the device corresponds to an air gap between the audio box and the surface of the device (e.g., outer casing). In some embodiments, the audio box of the device may include one or more speakers (or speaker boxes). For example, the speakers or speaker boxes may include one or more woofers (or woofer boxes) for generating low frequency sound waves, and one or more tweeters (or tweeter boxes) for generating high frequency sound waves. In some embodiments, when a bottom surface of a portable device is in contact with an external supporting surface (e.g., a table surface), an audio box of the portable device may include a woofer box on an upper side of a tweeter box. In some embodiments, the antenna may be placed on an outer portion or outer surface of a woofer/tweeter/speaker box.

In some embodiments, an air gap may correspond to a spacing between an antenna and a housing or a casing of a portable device. For example, the air gap may correspond to a spacing of 3 mm to 7 mm. The size or length of the air gap may be determined based on several factors including, for example, the size of antenna, the amount of power radiating through the air gap, and/or the form factor of the device.

In some embodiments, an antenna placed/incorporated/located in or on a side of an audio box may be of any antenna type, including flex (flexible circuit) antenna, dipole antenna, alias antenna, printed antenna, or a combination thereof. In some embodiments, the size of the antenna may be determined according to a desired radiation pattern/shape. The radiation pattern of the antenna can include a "radiation hotspot" of the antenna, which refers to a portion of the radiation pattern where a radiation pattern intensity is higher (e.g., than a threshold) or highest in certain direction(s).

According to certain aspects, embodiments in the present disclosure relate to techniques for using one or more reflectors or shields (e.g., a copper tape) on an inner surface of a wireless electronic device. Since the reflector or shield is placed to be at a distance from an antenna, the impact on the antenna performance (for the device's communications functions) can be minimal. For example, the antenna performance can still meet key performance indicators (KPIs) such as input reflection coefficient, antenna efficiency, antenna gain, etc. In some embodiments, the reflector or shield can serve two purposes. First, it can act as a shield between the human body and the antenna, reducing the RF exposure to the human body. Secondly, the reflector or shield can act as a reflector antenna in a radiation path/direction of the antenna, directing energy away from a surface of the device (e.g., a right edge of the device), thereby reducing the energy going towards the body. Both in simulations as well as measurements, the use of the reflector or shield can be verified to meet the compliance requirements for SAR without requiring a power back-off, thereby improving the user experience (e.g., more transmit power, higher data rate and wider range of wireless communication compared with traditional approaches), while also meeting the FCC SAR requirements.

In some embodiments, the reflector may be configured or implemented as a sheet or a tape of any conductive material. The conductive (e.g., metallic, electrically conductive, etc.) material may include, but not limited to, copper, aluminum, nickel, or platinum, silver, gold, brass, steel, or tin. In some embodiments, the reflector of a particular material may have a thickness that is greater than or equal to a skin depth of the material. In some embodiments, a thicker reflector (e.g., thicker than the skin depth) is preferable for ease of assembly. In some embodiments, the reflector of a particular material may have a thickness that is two or three times (or some other amount) greater than a skin depth of the material. The conductive material may also include a conductive foam such as polyethylene foam filled with carbon.

In some embodiments, the reflector may be placed on an inner/outer surface of the device, thereby shielding an RF electromagnetic field between the antenna and the subject's body. For example, the reflector may be placed on an inner surface of a side edge of the device to shield or partially cover the antenna that is located within the device and away from the side edge of the device. In some embodiments, the reflector may be placed on an outer surface of the device. In some embodiments, when the antenna operates at an operating wavelength of $\lambda$ unit length, the reflector may be placed $\lambda/25$ unit length apart from the antenna, so as not to adversely affect the signal transmission efficiency of the antenna (e.g., allowing for at least 50% or −3 dB efficiency). For example, $\lambda$ unit length equals 12.5 cm for 2.4 GHz band, and the distance between the antenna and the reflector may be 5 mm or more.

In some embodiments, a distance from the antenna to the reflector may be determined based on one or more factors including any one or more of (1) antenna performance, (2) a form factor for the device, and/or (3) shielding performance of the reflector. For example, if the reflector is placed on an inner/outer surface of the device, as the distance becomes farther/larger, (1) the antenna can become closer to other circuitry (2) due to the form factor of the device, thereby degrading the performance of the antenna, and (3) the shielding performance of the reflector can become smaller with respect to a size/extent of a SAR hotspot where the maximum energy is absorbed at the SAR hotspot. In some embodiments, a distance from the antenna to the reflector may be greater than or equal to 3 mm. Preferably, a distance from the antenna to the reflector may be in a range of 3-7 mm. If the distance is smaller than 3 mm, for instance when the reflector is too close to the antenna, the antenna may stop its operations or its performance may be significantly reduced. On the other hand, if the distance is greater than 7 mm, for instance when the reflector is too far from the antenna, the reflector may stop shielding an RF electromagnetic field or its shielding performance may be reduced.

In some embodiments, the reflector may have a size/area larger than the antenna. In some embodiments, the reflector may have substantially the same shape as that of the antenna. In the present disclosure, references to "approximately," "about" "substantially" or other terms of degree include variations of +/−10% from the given measurement, unit, or range unless explicitly indicated otherwise. For example, the reflector may have a shape completely covering a radiation pattern of the antenna in a view/direction from a surface of the outer housing/casing of the device where the reflector is placed. In some embodiments, the reflector may partially overlap the antenna (e.g., overlap a projection of the antenna in a direction perpendicular to the antenna's main surface plane). For example, the reflector may have a shape partially overlapping a radiation pattern of the antenna in a view/direction from a surface of the reflector, or from a surface of the outer housing/casing of the device where the reflector is placed. In some embodiments, the reflector may partially overlap a radiation hotspot of the antenna. For example, the reflector may have a shape partially overlapping a radiation hotspot of the antenna in a view from a surface of the outer housing/casing of the device where the reflector is placed.

Embodiments in the present disclosure can have the following advantages.

First, some embodiments can provide useful techniques for satisfying the FCC SAR requirements by reducing the SAR to less than 1.6 W/kg or less than 1.2 W/kg by (1) placing an antenna within in a wireless device and/or (2) using a reflector to shield/reflect radiation from the antenna.

Second, some embodiments can provide useful techniques for placing/incorporating an antenna and a reflector to/into a device to improve the SAR (e.g., without requiring additional hardware/firmware to detect the presence of a human body), and thereby reducing cost and complexity. For example, these techniques can obviate the use and/or integration of capacitive sensors into the device, and/or the routing of signals from the sensors to the PCB.

Third, some embodiments can provide useful techniques for satisfying the FCC SAR requirements without significantly reducing the transmission efficiency, data rate and/or the operational range of the device. For example, a reflector can be placed at a distance from the antenna such that the signal efficiency of the antenna is not adversely affected.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a diagram of an example of a wireless electronic device, according to an example implementation of the present disclosure.

Figure 6:
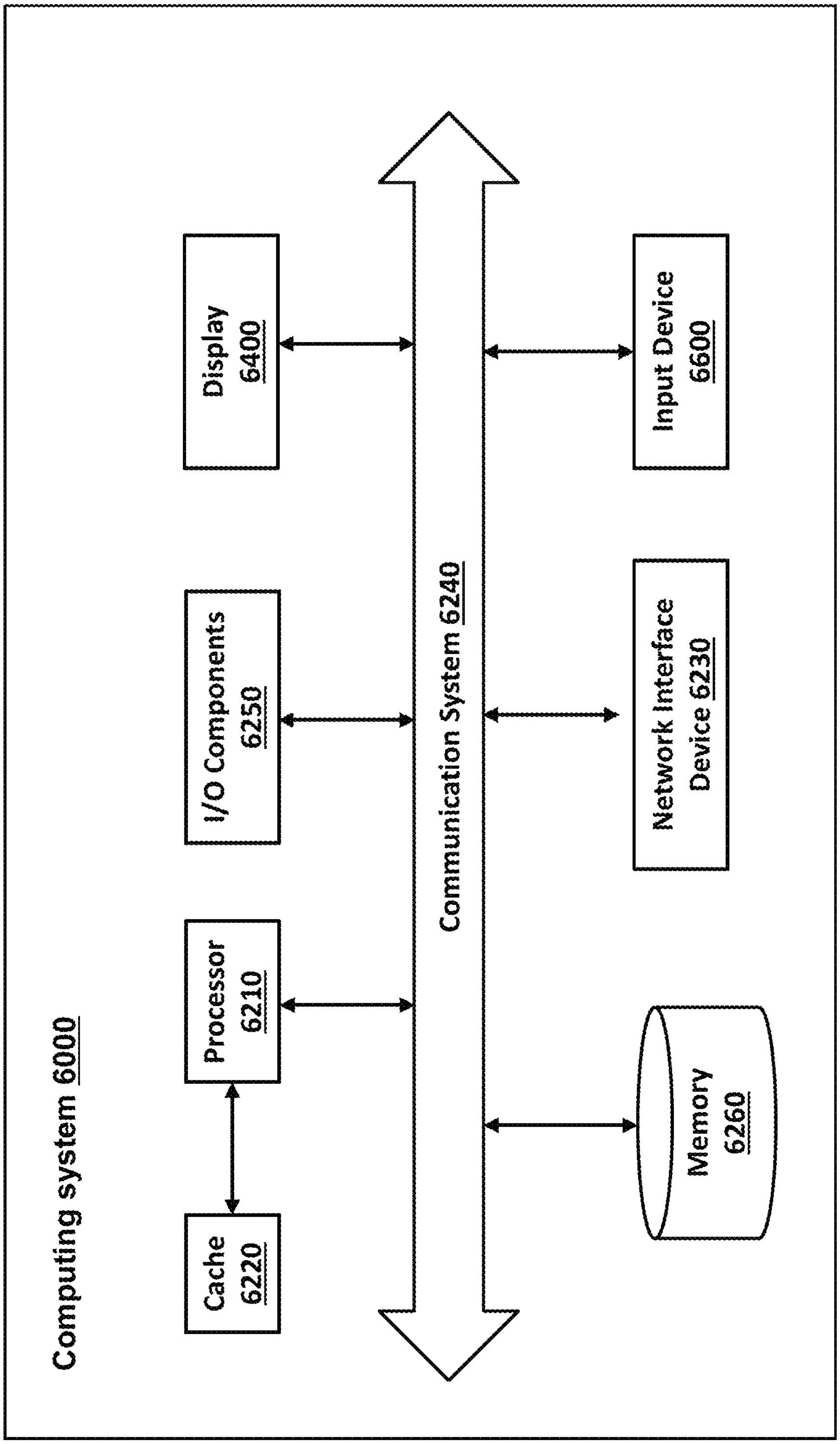
FIG. 6 is a block diagram of an embodiment of a computing system, according to an example implementation of the present disclosure.

Referring to FIG. 1, a wireless electronic device 1000 may have a configuration similar to a computing system 6000 (see FIG. 6). The wireless electronic device 1000 may have an outer casing (case or casing or housing) 1800. The outer casing may be electrically non-conductive. The wireless electronic device 1000 may have at least a front side (front surface) 1200, a left side (left edge) 1300, a right side (right edge) 1400, and a bottom side (bottom surface) 1600. With reference to X-axis, Y-axis, and Z-axis as shown FIG. 1, in which X-axis and Y-axis are perpendicular to each other and Z-axis is vertical/perpendicular with respect to a horizontal plane (X-Y plane) made up by X-axis and Y-axis, the bottom side 1600 may be substantially parallel with the X-Y plane, and the left side and the right side may be substantially parallel with Z-axis. The wireless electronic device 1000 may have a display 1220 (whose configuration is similar to that of a display 4440 in FIG. 6) on the front side 1200. On the right side, the wireless electronic device 1000 may have an audio box 1460 within the outer casing 1800. In some embodiment, the audio box 1460 may include a tweeter box 1470. In some embodiment, the audio box may include, on an inner surface thereof or an outer surface thereof, an antenna 1420, and/or an antenna 1440.

Each of the antennas 1420, 1440 may be one of a Bluetooth® antenna, WiFi main antenna, WiFi auxiliary antenna, or cellular antenna, as non-limiting examples. In some embodiments, each of the antennas 1420, 1440 may be placed in or on a side of the audio box 1460. Each antenna may be from one or more antenna types including flex (flexible circuit) antenna, dipole antenna, alias antenna, printed antenna, or a combination thereof. In some embodiments, an antenna may be placed in the outer casing 1800 to be away from a surface of the device (e.g., right surface 1400), hence when a human body is in contact with, or in proximity of the device, increasing the distance from the antenna to the body and reducing the RF exposure. In some embodiments, an antenna may be placed internally at a distance of less than or equal to 7 mm from an edge or an outer surface of the device (e.g., right surface 1400) instead of placing the antenna directly on the outer surface, so as to increase the spacing from an expected/actual location of the body and minimize the RF absorption by the body.

In some embodiments, a distance between the antenna and an edge or an outer surface of the device (e.g., right surface 1400) may be determined by determining a location of a human body relative to the device (e.g., location of a SAR hotspot) and moving the antenna away from the location of the human body such that the SAR value measured at a given distance meets FCC SAR requirements. For example, if the SAR hotspot of a body is located on or in proximity of a right edge of a portable wireless device (e.g., on or in proximity of the right edge 1400 in FIG. 1), the location of the antenna inboard can be determined to be away from the right edge by a distance such that the SAR value measured with the antenna placed at the distance meets the FCC SAR requirements, e.g., being less than 1.6 W/kg. In some embodiments, the antenna may be placed 3-7 mm away from an outer casing (e.g., outer casing 1800 in FIG. 1) or a side edge (e.g., right surface 1400 in FIG. 1) of the device.

Figure 3:
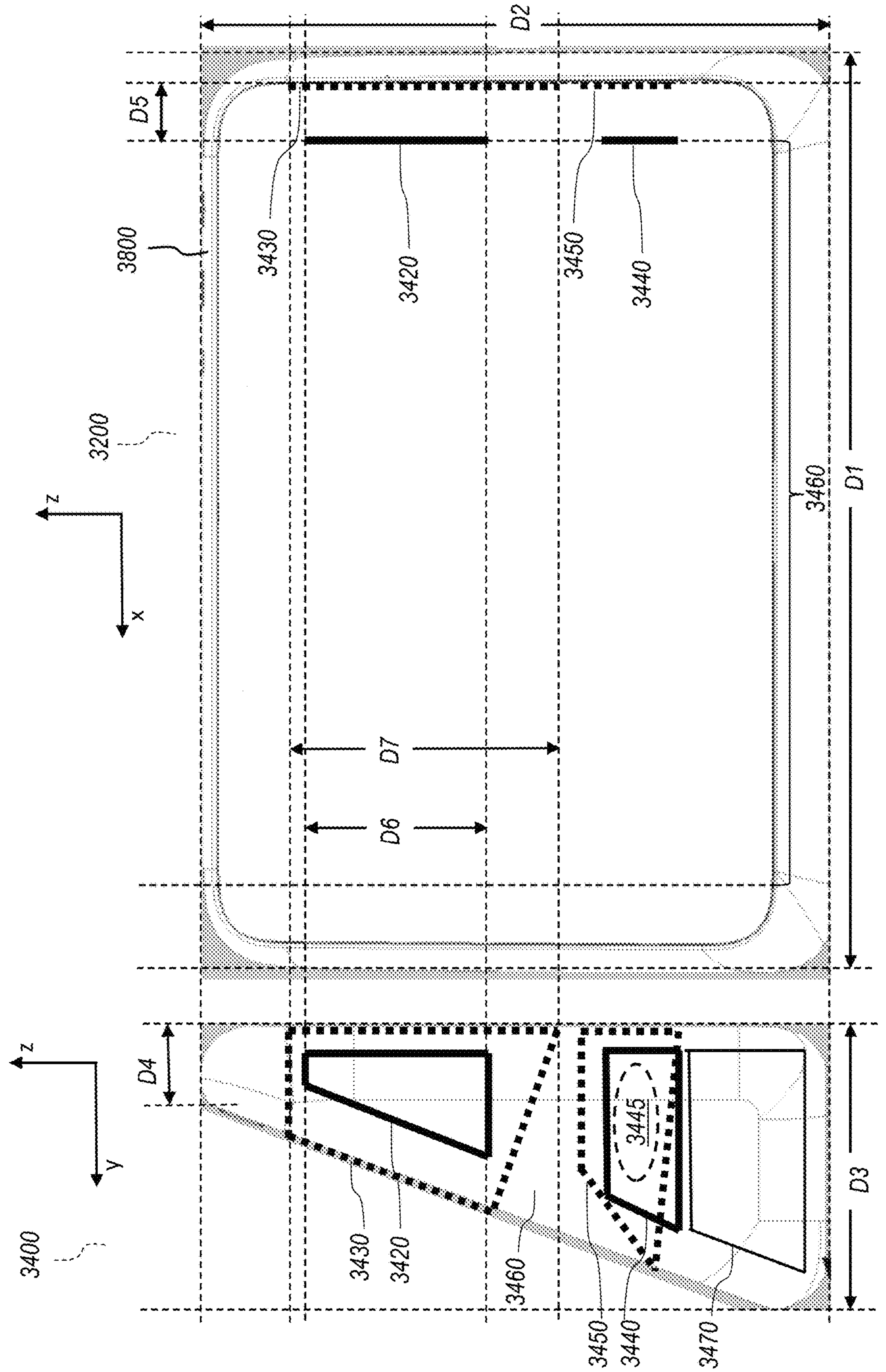
FIG. 3 shows different views of an embodiment of a wireless electronic device for reducing SAR, according to an example implementation of the present disclosure.

In some embodiments, an antenna (e.g., antenna 1420, 1440 in FIG. 1) may be placed, printed, mounted, or implemented in or on a side/surface of an audio box (e.g., audio box 1460 in FIG. 1) of the device such that a distance from the antenna to a surface of the device corresponds to an air gap (e.g., air gap with distance D5 in FIG. 3). For example, as shown in FIG. 1, the antenna 1420, 1440 may be placed inside or outside the audio box 1460. In some embodiments, the antenna may be printed on a surface of the audio box (e.g., an inner surface or an outer surface of the audio box 1460). In some embodiments, the audio box of the device may include one or more woofer boxes for generating low frequency sound waves, and one or more tweeter box (e.g., tweeter box 1470 in FIG. 1, tweeter box 3480 in FIG. 3) for generating high frequency sound waves. In some embodiments, a woofer box may be disposed on an upper side of a tweeter box (e.g., tweeter box 3470 in FIG. 3). In some embodiments, the antenna (e.g., antenna 1420, 1440 in FIG. 1) may be placed on an outer portion or outer surface of a woofer box.

Figure 2:
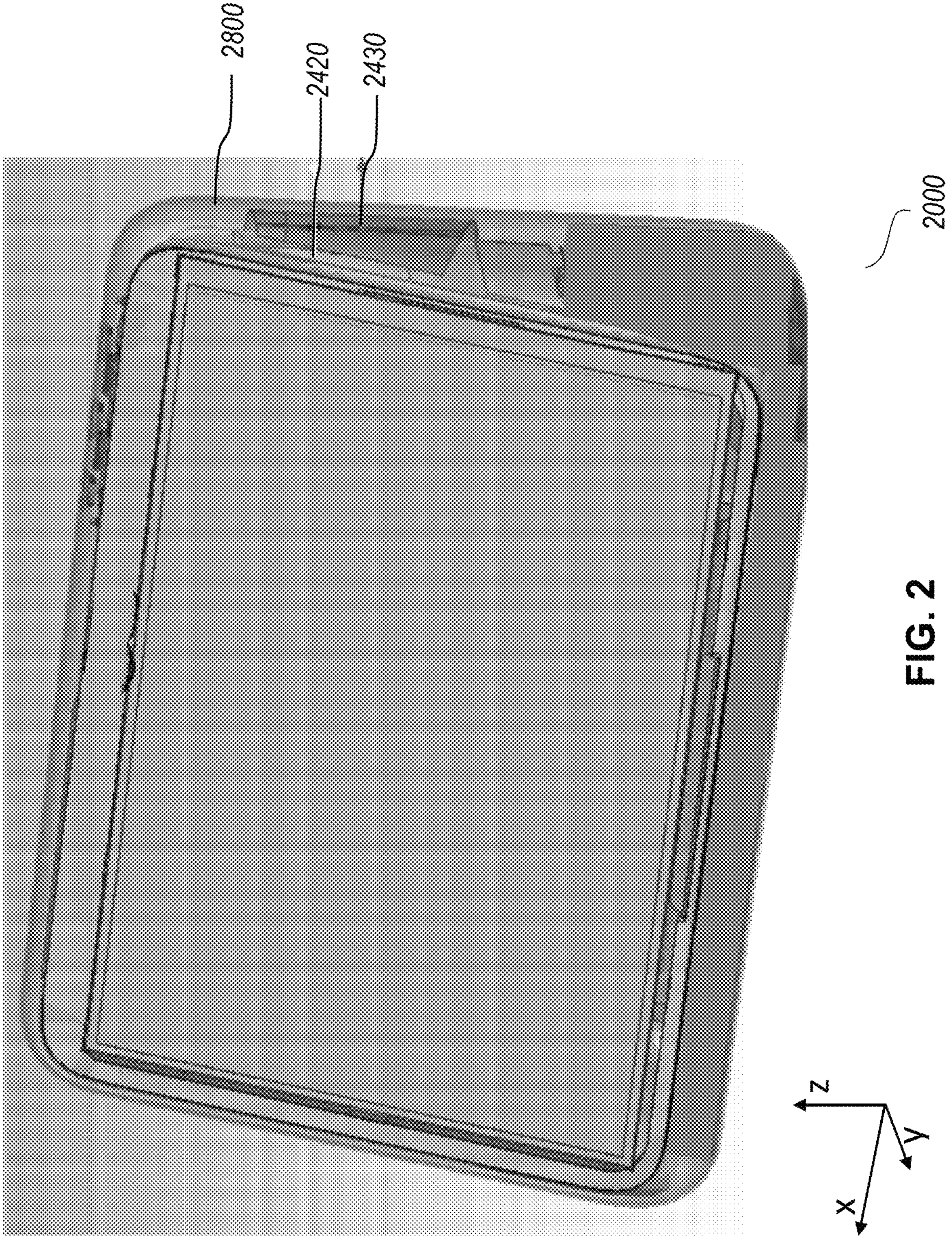
FIG. 2 is a diagram of an embodiment of a wireless electronic device for reducing SAR (e.g., using a metallic sheet), according to an example implementation of the present disclosure.

FIG. 2 is a diagram of an embodiment of a wireless electronic device for improving SAR, according to an example implementation of the present disclosure.

Referring to FIG. 2, a wireless electronic device 2000 may have a shape and/or configuration similar to those of the wireless electronic device 1000 (see FIG. 1), except for the device 2000 has a metallic sheet 2430 to shield or reflect energy radiated by an antenna 2420. In some embodiments, the metallic sheet 2430 may be a tape, plate or layer of conductive material (e.g., a copper tape). When an antenna (e.g., antennas 2420) is configured to perform wireless communication of signals at an operating wavelength of λ unit length, the metallic sheet may be disposed on a portion of the outer casing and placed at a distance of at least λ/25 unit length apart from the antenna. When a subject (e.g., a SAR hotspot of a body) is on or in proximity of the right edge of the device 2000, the metallic sheet 2430 may be configured to shield the subject exposed to energy radiated by the antenna to limit the SAR of the subject to less than 1.6 W/kg. In some embodiments, the metallic sheet is configured to limit the SAR of the subject to less than 1.2 W/kg.

In some embodiments, the metallic sheet (e.g., metallic sheet 2430 in FIG. 2) may be disposed on an inner surface of the outer casing (e.g., outer casing 2800 in FIG. 2). In some embodiments, the metallic sheet may include at least one of copper, aluminum, nickel, or platinum, silver, or gold. In some embodiments, the metallic sheet may be a metallic tape (e.g., a copper tape) attached to the outer casing. In some embodiments, the antenna may be placed at a range of 3-7 millimeter (mm) apart from the outer casing. If the distance is smaller than 3 mm, e.g., the metallic sheet is too close to the antenna, the antenna's performance may be significantly reduced. On the other hand, if the distance is greater than 7 mm, e.g., the metallic sheet is too far from the antenna, the reflector may fail to shield an RF electromagnetic field or its shielding performance may be reduced.

In some embodiments, the metallic sheet (e.g., metallic sheet 2430 in FIG. 2) may have a thickness greater than or equal to a skin depth of a material of the metallic sheet. For example, for use in the 2.4 GHz band, a copper tape as the metallic sheet may have a thickness of at least 1.33 micrometer (electrical skin depth of copper at 2.4 GHz is 1.33 micrometer). A copper tape as the metallic sheet may have a thickness that is at least two or three times greater than a skin depth of the material (e.g., a thickness of at least 2.66 micrometer or 4 micrometer).

FIG. 3 shows different views of an embodiment of a wireless electronic device for improving SAR (e.g., using one or more metallic sheets), according to an example implementation of the present disclosure.

FIG. 3 includes (1) a front view 3200 showing a front side of a wireless electronic device 3000 in an X-Z plane, and (2) a side view 3400 showing a right side of the device 3000 in a Y-Z plane. The wireless electronic device 3000 may have shape and configuration similar to those of the wireless electronic device 2000 (see FIG. 2), except that the device 3000 has two metallic sheets 3430 and 3420 corresponding to respective antennas 3420 and 3440 on the right side of the device 3000.

In some embodiments, a metallic sheet may have (1) substantially the same shape (e.g., structure, profile, dimensions, and/or area) as a shape of an antenna which radiates energy shielded or reflected by the metallic sheet, and/or have (2) an area greater than or equal to an area of the antenna, such that the metallic sheet completely or substantially covers a radiation pattern of the antenna in a radiation direction of the antenna. In the side view 3400 in FIG. 3 (a view from the right side or surface of the device 3000), if the antenna 3420 has an antenna radiation pattern directed toward the subject's body part (e.g., in a radiation direction substantially parallel to X-axis) on a right surface of the device 3000, the metallic sheet 3430 may have (1) substantially the same shape as the shape of an antenna 3420, and/or have (2) an area greater than or equal to an area of the antenna 3420 in the side view 3400. For example, when the front side of the device 3000 has a dimension of D1=256.2 mm and D2=174.2 mm, and the right side of the device 3000 has a dimension of D2=174.2 mm, D3=78.8 mm, and D4=21.7 mm, the vertical length of the metallic sheet 3430 (D7=59.5 mm) may be greater than the vertical length of the antenna 3420 (D6=43.2 mm).

In some embodiments, the metallic sheet may at least partially shield, block or overlap a radiation pattern of the antenna in a radiation direction of a radiation hotspot of the antenna such that the metallic sheet completely or substantially covers (e.g., provide 90% coverage over) the radiation hotspot of the antenna. Referring to FIG. 3, if the antenna 3440 has a radiation hotspot (e.g., main lobe) 3445 of antenna radiation pattern directed toward the subject's body part (e.g., in a radiation direction substantially parallel to X-axis) on the right surface of the device 3000, the metallic sheet 3450 may partially overlap the antenna 3440 in an area including the radiation hotspot 3445 in the side view 3400.

Referring to FIG. 3, in some embodiments, an air gap (e.g., air gap of distance D5) may be present between an antenna (e.g., antenna 3420) and a metallic sheet (e.g., metallic sheet 3430). In some embodiments, an air gap may be present between the antenna and an outer casing 3800 of the device 3000. For example, the distance D5 may be in a range of 3 mm to 7 mm between the antenna and the outer spacing of the device.

Figure 4:
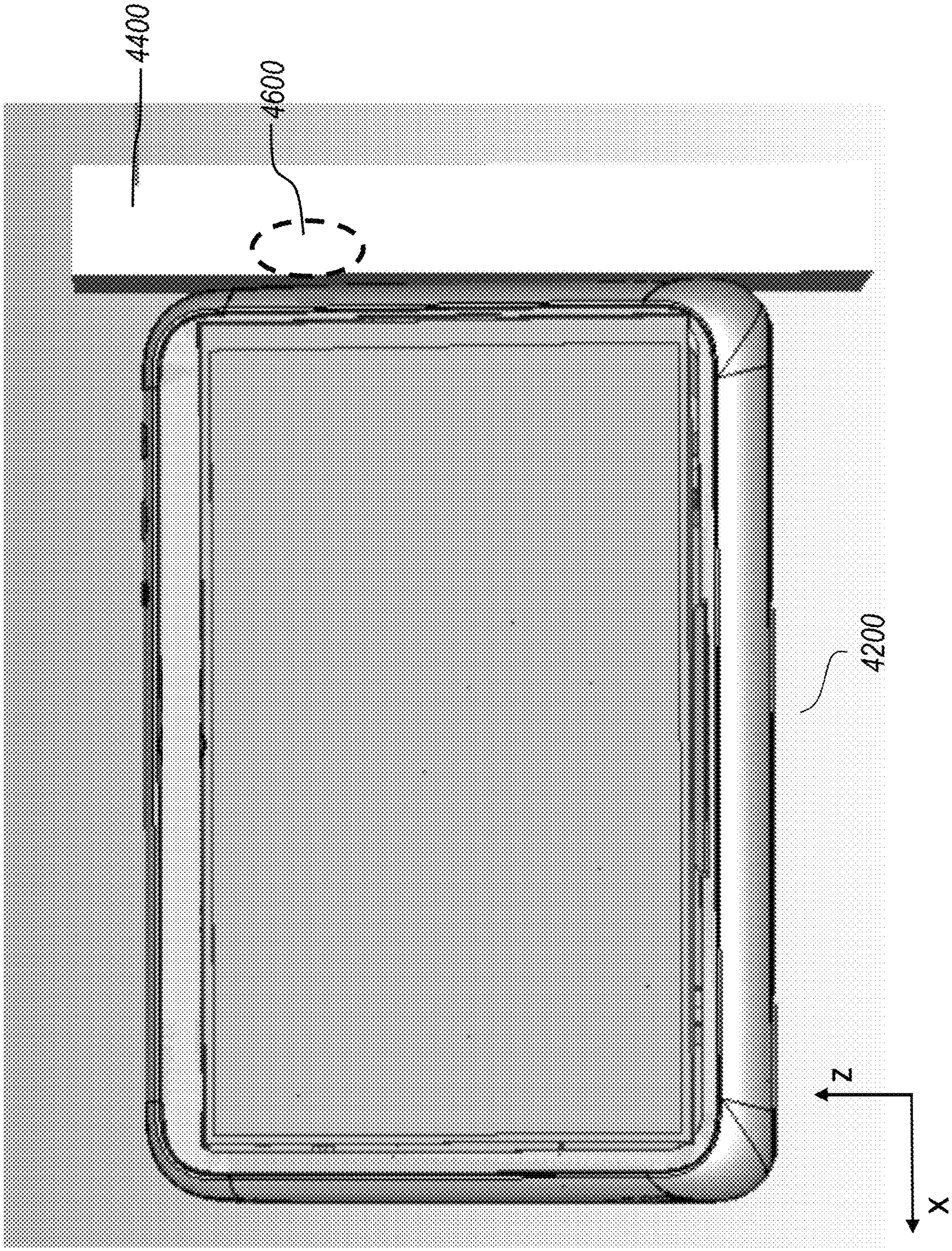
FIG. 4 is a diagram showing a simulation/measurement setup of an embodiment of a wireless electronic device for reducing SAR, according to an example implementation of the present disclosure.

FIG. 4 is a diagram showing a simulation/measurement setup of an embodiment of a wireless electronic device for improving SAR using a metallic sheet, according to an example implementation of the present disclosure. For simulations, an external block 4400 can be placed against a wireless electronic device 4200 to mimic a human body phantom including a SAR hotspot 4600. The wireless electronic device 4200 has shape and configuration similar to those of the device 2000 (see FIG. 2).

Simulations were run with two simulation settings: a metallic sheet setting and a comparative/reference (no metallic sheet) setting. In the metallic sheet setting, the wireless electronic device 4200 has a metallic sheet (a copper tape) located in the right side of the device when the antenna operates in the 2.4 GHz band. In the comparative (no metallic sheet) setting, the wireless electronic device 4200 has no metallic sheet when the antenna operates in 2.4 GHz band.

Simulation results show that with a copper tape in the right side of the device, (1) the SAR value at the SAR hotspot 4600 was 0.3 W/kg averaged over 1 gram at a transmit power of 18 dBm, and (2) a maximum permissible conducted transmit power (that can meet the FCC SAR requirements) was 22 dBm. On the other hand, without a metallic sheet, (1) the SAR value at the SAR hotspot 4600 was 1.13014 W/kg averaged over 1 gram at a transmit power of 18 dBm, and (2) a maximum permissible conducted transmit power (that can meet the FCC SAR requirements) was 18.26 dBm. Hence, compared with the setting with no metallic sheet, the use of a copper tape can reduce the SAR at the SAR hotspot (at the same transmit power of 18 dBm). The use of a copper tape also can improve the maximum permissible transmit power that can meet the FCC compliance requirements.

Moreover, values of (1) antenna efficiency and (2) SAR were measured with a wireless electronic device having a metallic sheet (a copper tape) in the right side of the device (whose configuration is similar to the device 2000 shown in FIG. 2) by varying a value of the frequency band in which the wireless electronic device operates.

The measurement results of antenna efficiency over frequency bands of 2.4 GHz and 5 GHz are shown in Table 1 below. It is noted that a transmit power of 20 dBm was used for the 2.4 GHz band measurements while a transmit power of 16 dBm was used for the 5 GHz band measurements. As shown in Table 1, the use of a copper tape did not significantly reduce the transmission efficiency. As the results of the 5 GHz band measurements were obtained using a transmit power less than that of the 2.4 GHz band measurements, the wireless electronic device (with a copper tape) can use more transmit power (e.g., more than 16 dBm) without significantly reducing the transmission efficiency of the antenna(s).

TABLE 1

Measurement Results of Antenna Efficiency

| Frequency (MHz) | Efficiency (dB) |
|---|---|
| 2400 | −2.95 |
| 2410 | −2.86 |
| 2420 | −2.85 |
| 2430 | −2.86 |
| 2440 | −2.89 |
| 2450 | −2.92 |
| 2460 | −2.89 |
| 2470 | −2.88 |
| 2480 | −2.93 |
| 2490 | −3.02 |
| 2500 | −3.25 |
| 5100 | −3.72 |
| 5180 | −3.80 |
| 5200 | −3.80 |
| 5250 | −4.06 |
| 5300 | −3.91 |
| 5350 | −4.03 |
| 5400 | −3.89 |
| 5450 | −3.70 |
| 5500 | −3.38 |
| 5550 | −3.25 |
| 5600 | −3.09 |
| 5650 | −3.19 |
| 5700 | −3.38 |
| 5750 | −3.48 |
| 5805 | −3.42 |
| 5850 | −3.40 |

Table 2 below shows the measurement results of (1) SAR at a location on or in close proximity to a right side of a wireless electronic device having a copper tape on the right side thereof (whose configuration is similar to the device 2000 shown in FIG. 2) and operating in various channels, and (2) SAR at a location on or in close proximity to a bottom side of the wireless electronic device operating in various channels. Table 2 also shows the comparative measurement results of (3) SAR at a location on or in close proximity to a right side of a wireless electronic device without metallic sheets operating in various channels, and (4) SAR at a location on or in close proximity to a bottom side of the wireless electronic device without metallic sheets operating in various channels. It is noted that a transmit power of 20 dBm was used for the measurements at channels 1, 6, and 11 while a transmit power of 16 dBm was used the measurements at channels 36, 100, and 165. Table 2 shows that with a copper tape on the right side of the device, the SAR values measured on both (1) the right side and (2) the bottom side of the device were less than 1.6 W/Kg in all channels, thereby meeting the FCC SAR requirements. It is shown that with a copper tape on the right side of the device, the SAR values measured on both (1) the right side and (2) the bottom side of the device were even less than 1.2 W/Kg in all channels. On the other hand, without a copper tape in a wireless electronic device, the SAR values measured on (3) the right side of the device were greater than 1.6 W/Kg in 2.4 GHz channels, failing to meet the FCC SAR requirements.

TABLE 2

SAR Measurement Results

| Channel | SAR With Metallic Sheet (Unit: W/Kg) | | SAR Without Metallic Sheet | |
|---|---|---|---|---|
| | (1) Right Side | (2) Bottom Side | (3) Right Side | (4) Bottom Side |
| CH 1 (2.4 GHz) | 1.13 | 0.315 | 2.62 | 1.05 |
| CH 6 (2.4 GHz) | 1.01 | 0.286 | 2.83 | 1.13 |
| CH 11 (2.4 GHz) | 0.926 | 0.264 | 2.86 | 1.12 |
| CH 36 (5 GHz) | 0.383 | 0.346 | 0.956 | 1.21 |
| CH 100 (5 GHz) | 0.365 | 0.557 | 0.992 | 1.3 |
| CH 165 (5 GHz) | 0.546 | 0.544 | 0.675 | 1.09 |

From the results shown in Table 1 and Table 2, it can be noted that the use of a metallic sheet in a wireless electronic device as described herein can improve SAR in both 2.4 and 5 GHz bands without significantly reducing the transmission efficiency of the antenna(s).

Figure 5:
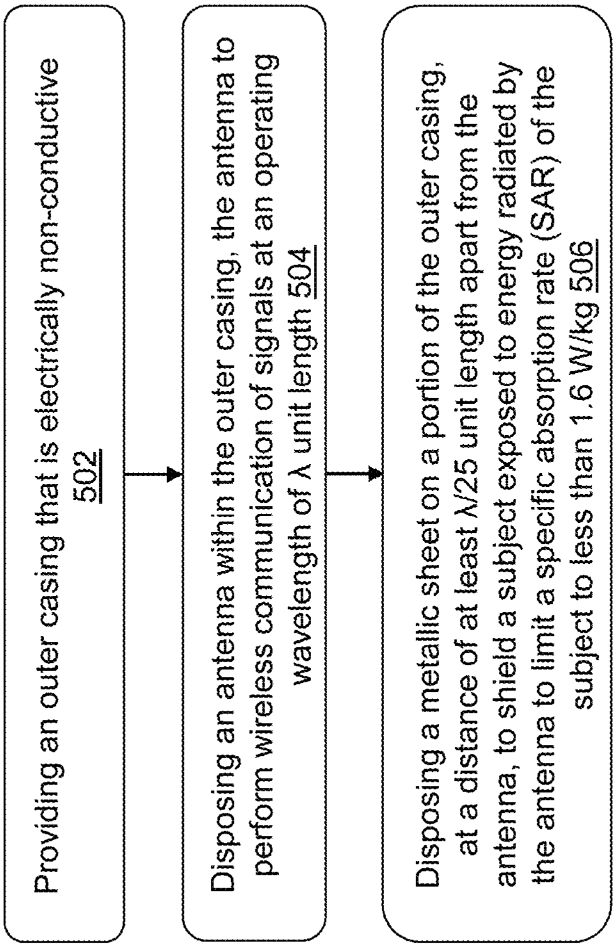
FIG. 5 is a flow chart illustrating a method for implementing a wireless electronic device for reducing SAR, according to an example implementation of the present disclosure.

FIG. 5 is a flow chart illustrating a method for implementing a wireless electronic device (e.g., device 2000 in FIG. 2 or device 3000 in FIG. 3) for improving SAR using a metallic sheet (e.g., metallic sheet 2430 in FIG. 2 or metallic sheet 3430, 3450 in FIG. 3), according to an example implementation of the present disclosure.

In brief overview, the method includes providing an outer casing (e.g., outer casing 2800 in FIG. 2 or outer casing 3800 in FIG. 3) of a wireless electronic device (502). The method can include disposing an antenna (e.g., antenna 2420 in FIG. 2 or antenna 3420, 3440 in FIG. 3) within the outer casing (504). The method can include disposing a metallic sheet (e.g., metallic sheet 2430 in FIG. 2 or metallic sheet 3430, 3450 in FIG. 3) on a portion of the outer casing (506).

In further details of 502, and in some embodiments, an outer casing (e.g., outer casing 2800 in FIG. 2 or outer casing 3800 in FIG. 3) that is electrically non-conductive may be provided. For example, the non-conductive case materials may include plastics (non-conductive polymer), leather, non-conductive fabric, synthetic rubbers, or polyurethane.

In further details of 504, and in some embodiments, an antenna may be disposed within the outer casing and configured to perform wireless communication of signals at an operating wavelength of λ unit length. In some embodiments, an antenna may be placed in an outer casing (e.g., outer casing 3800 in FIG. 3) to be away from a surface of the device (e.g., an inner surface of the outer casing 3800 in FIG. 3), hence when a human body is in contact with, or in proximity of, the device, increasing the distance from the antenna to the body and reducing the RF exposure. In some embodiments, an antenna may be placed in the device in a distance of less than or equal to 7 mm from an edge or an outer surface of the device e.g., an inner surface of the outer casing 3800 in FIG. 3). In some embodiments, the antenna may be placed at a distance within a range of 3-7 mm apart from the outer casing (e.g., D5 is in a range of 3-7 mm in FIG. 3).

In further details of 506, and in some embodiments, a metallic sheet (e.g., metallic sheet 3430, 3450 in FIG. 3) may be disposed or attached on a portion of the outer casing, at a distance of at least λ/25 unit length apart/away from the antenna, to shield a subject exposed to energy radiated by the antenna to limit the SAR of the subject to less than 1.6 W/kg (see Table 2). For example, λ equals 12.5 cm for 2.4 GHz band, and the distance between the antenna and the metallic sheet may be 5 mm. In some embodiments, the metallic sheet is configured to limit the SAR of the subject to less than 1.2 W/kg (see Table 2). In some embodiments, the metallic sheet may have a thickness greater than or equal to a skin depth of a material of the metallic sheet, and in some embodiments a thickness that is two or three times greater than a skin depth of a material of the metallic sheet. For example, for use in the 2.4 GHz band, a copper tape as the metallic sheet may have a thickness of at least 1.33 micrometer (electrical skin depth of copper at 2.4 GHz is 1.33 micrometer), and in some embodiments a thickness of at least 2.66 micrometer or 4 micrometer.

In some embodiments, the metallic sheet (e.g., metallic sheet 3430, 3450 in FIG. 3) may be disposed on an inner surface of the outer casing (e.g., outer casing 3800 in FIG. 3). In some embodiments, the metallic sheet may include at least one of copper, aluminum, nickel, or platinum, silver, or gold. In some embodiments, the metallic sheet may be a metallic tape/layer/plate (e.g., copper tape) attached to the outer casing.

In some embodiments, the metallic sheet (e.g., metallic sheet 3450 in FIG. 3) may at least partially overlap a radiation pattern (e.g., radiation hotspot 3445 in FIG. 3) of the antenna (e.g., antenna 3440 in FIG. 3). The metallic sheet (e.g., metallic sheet 3430 in FIG. 3) may have substantially a same shape as a shape of the antenna (e.g., antenna 3420 in FIG. 3). The metallic sheet may have an area (e.g., the area of the metallic sheet 3430 projected on the right surface of the device 3000 in FIG. 3) greater than or equal to an area of the antenna (e.g., the area of the antenna 3420 projected on the right surface of the device 3000 in FIG. 3).

The method may include forming an air gap (e.g., D5 in FIG. 3) between the antenna (e.g., antenna 3420 in FIG. 3) and the metallic sheet (e.g., metallic sheet 3430 in FIG. 3). The method may include forming an air gap air gap between the antenna and the outer casing (e.g., outer casing 3800 in FIG. 3). In disposing the antenna, the antenna may be printed on a surface of an audio box (e.g., antenna 3420 may be printed on an inner surface or an outer surface of the audio box 3460 in FIG. 3).

FIG. 6 is a block diagram of an embodiment of a computing system, according to an example implementation of the present disclosure.

Referring to FIG. 6, the illustrated example computing system 6000 includes one or more processors 6210 in communication, via a communication system 6240 (e.g., bus), with memory 6260, at least one network interface controller 6230 with network interface port for connection to a network (not shown), and other components, e.g., input/output ("I/O") components 6250. Generally, the processor(s) 6210 will execute instructions (or computer programs) received from memory. The processor(s) 6210 illustrated incorporate, or are directly connected to, cache memory 6220. In some instances, instructions are read from memory 6260 into cache memory 6220 and executed by the processor(s) 6210 from cache memory 6220.

In more detail, the processor(s) 6210 may be any logic circuitry that processes instructions, e.g., instructions fetched from the memory 6260 or cache 6220. In many implementations, the processor(s) 6210 are microprocessor units or special purpose processors.

The computing device 4200 may be based on any processor, or set of processors, capable of operating as described herein. The processor(s) 6210 may be single core or multi-core processor(s). The processor(s) 6210 may be multiple distinct processors.

The memory 6260 may be any device suitable for storing computer readable data. The memory 6260 may be a device with a fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 6000 may have any number of memory devices 6260.

The cache memory 6220 is generally a form of computer memory placed in close proximity to the processor(s) 6210 for fast read times. In some implementations, the cache memory 6220 is part of, or on the same chip as, the processor(s) 6210. In some implementations, there are multiple levels of cache 6220, e.g., L2 and L3 cache layers.

The network interface controller 6230 manages data exchanges via the network interface (sometimes referred to as network interface ports). The network interface controller 6230 handles the physical and data link layers of the OSI model for network communication. In some implementations, some of the network interface controller's tasks are handled by one or more of the processor(s) 6210. In some implementations, the network interface controller 6230 is part of a processor 6210. In some implementations, a computing system 6000 has multiple network interfaces controlled by a single controller 6230. In some implementations, a computing system 6000 has multiple network interface controllers 6230. In some implementations, each network interface is a connection point for a physical network link (e.g., a cat-5 Ethernet link). In some implementations, the network interface controller 6230 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 6230 implements one or more network protocols such as Ethernet. Generally, a computing device 4200 exchanges data with other computing devices via physical or wireless links through a network interface. The network interface may link directly to another device or to another device via an intermediary device, e.g., a network device such as a hub, a bridge, a switch, or a router, connecting the computing device 4200 to a data network such as the Internet.

The computing system 6000 may include, or provide interfaces for, one or more input or output ("I/O") devices. Input devices 6600 include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 6000 may include an interface (e.g., a universal serial bus (USB) interface) for connecting input devices, output devices, or additional memory devices (e.g., portable flash drive or external media drive). In some implementations, a computing device 4200 includes an additional device such as a co-processor, e.g., a math co-processor can assist the processor 6210 with high precision or complex calculations.

The components 6250 may be configured to connect with external media, a display 6400, an input device 6600 or any other components in the computing system 6000, or combinations thereof. The display 6400 may be a liquid crystal display (LCD), an organic light emitting diode (OLED), a flat panel display, a solid state display, a cathode ray tube (CRT), a projector, a printer or other now known or later developed display device for outputting determined information. The display 6400 may act as an interface for the user to see the functioning of the processor(s) 6210, or specifically as an interface with the software stored in the memory 6260.

The input device 6600 may be configured to allow a user to interact with any of the components of the computing system 6000. The input device 6600 may be a plurality pad, a keyboard, a cursor control device, such as a mouse, or a joystick. Also, the input device 6600 may be a remote control, touchscreen display (which may be a combination of the display 6400 and the input device 6600), or any other device operative to interact with the computing system 6000, such as any device operative to act as an interface between a user and the computing system 6000.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A wireless electronic device comprising:

an outer casing that is electrically non-conductive;

an antenna disposed within the outer casing, the antenna configured to perform wireless communication of signals at an operating wavelength of λ unit length; and a metallic sheet disposed on a portion of the outer casing and placed at a distance of at least λ/25 unit length apart from the antenna, the metallic sheet configured to shield a subject exposed to energy radiated by the antenna to limit a specific absorption rate (SAR) of the subject to less than 1.6 W/kg, wherein the metallic sheet at least partially overlaps a radiation pattern of the antenna in an area including a radiation hotspot of the radiation pattern, wherein the radiation hotspot is a portion of the radiation pattern where a radiation pattern intensity is highest in a certain direction, and wherein the metallic sheet is configured to reflect a radio frequency (RF) electromagnetic field that is generated by the antenna toward the subject.

2. The wireless electronic device of claim 1, wherein the metallic sheet is disposed on an inner surface of the outer casing.

3. The wireless electronic device of claim 1, wherein the metallic sheet includes at least one of copper, aluminum, nickel, or platinum, silver, or gold.

4. The wireless electronic device of claim 1, wherein the metallic sheet is a metallic tape attached to the outer casing.

5. The wireless electronic device of claim 1, wherein the antenna is placed at a range of 3-7 millimeter (mm) apart from the outer casing.

6. The wireless electronic device of claim 1, wherein the metallic sheet has substantially a same shape as a shape of the antenna.

7. The wireless electronic device of claim 1, wherein the metallic sheet has an area greater than or equal to an area of the antenna.

8. The wireless electronic device of claim 1, wherein the metallic sheet has a thickness greater than or equal to a skin depth of a material of the metallic sheet.

9. The wireless electronic device of claim 1, wherein the metallic sheet is configured to limit the SAR of the subject to less than 1.2 W/kg.

10. The wireless electronic device of claim 1, wherein an air gap is present between the antenna and the metallic sheet.

11. The wireless electronic device of claim 1, wherein an air gap is present between the antenna and the outer casing.

12. The wireless electronic device of claim 1, wherein the antenna is printed on a surface of an audio box.

13. A method for implementing a wireless electronic device, comprising:

providing an outer casing that is electrically non-conductive;

disposing an antenna within the outer casing, the antenna to perform wireless communication of signals at an operating wavelength of λ unit length; and disposing a metallic sheet on a portion of the outer casing, at a distance of at least λ/25 unit length apart from the antenna, to shield a subject exposed to energy radiated by the antenna to limit a specific absorption rate (SAR) of the subject to less than 1.6 W/kg, wherein the metallic sheet at least partially overlaps a radiation pattern of the antenna in an area including a radiation hotspot of the radiation pattern wherein the radiation hotspot is a portion of the radiation pattern where a radiation pattern intensity is highest in a certain direction, and wherein the metallic sheet is configured to reflect a radio frequency (RF) electromagnetic field that is generated by the antenna toward the subject.

14. The method of claim 13, wherein disposing the metallic sheet comprises:

disposing the metallic sheet on an inner surface of the outer casing.

15. The method of claim 13, wherein:

the metallic sheet is a metallic tape, and disposing the metallic sheet comprises attaching the metallic tape to the outer casing.

16. The method of claim 13, wherein disposing the antenna comprises:

placing the antenna at a range of 3-7 mm apart from the outer casing.

17. The method of claim 13, further comprising:

forming an air gap between the antenna and the metallic sheet.

18. The method of claim 13, further comprising:

forming an air gap between the antenna and the outer casing.

19. The method of claim 13, wherein disposing the antenna comprises:

printing the antenna on a surface of an audio box.

* * * * *